(12) United States Patent
Bhattacharyya et al.

(10) Patent No.: US 12,124,305 B2
(45) Date of Patent: Oct. 22, 2024

(54) POWER PRIORITY ADJUSTMENT IN POWER OVER ETHERNET SYSTEM BASED ON AVAILABILITY OF ALTERNATIVE POWER SOURCE

(71) Applicant: HEWLETT PACKARD ENTERPRISE DEVELOPMENT LP, Spring, TX (US)

(72) Inventors: Murari Bhattacharyya, Bangalore (IN); Nitin Duggal, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 60 days.

(21) Appl. No.: 18/151,874

(22) Filed: Jan. 9, 2023

(65) Prior Publication Data
US 2024/0118734 A1    Apr. 11, 2024

(30) Foreign Application Priority Data
Oct. 7, 2022 (IN) .............................. 202241057722

(51) Int. Cl.
 G06F 11/30    (2006.01)
 G06F 1/26     (2006.01)
 H02J 9/00     (2006.01)
 G06F 1/30     (2006.01)

(52) U.S. Cl.
 CPC ............... *G06F 1/263* (2013.01); *H02J 9/00* (2013.01); *G06F 1/30* (2013.01)

(58) Field of Classification Search
 CPC ................... G06F 1/263; H02J 9/00
 USPC ......................................................... 713/340
 See application file for complete search history.

(56) References Cited

U.S. PATENT DOCUMENTS

| | | | |
|---|---|---|---|
| 7,982,336 B2 * | 7/2011 | Hiscock | H02J 1/14 |
| | | | 307/29 |
| 9,146,613 B2 * | 9/2015 | Hamdi | G06F 1/3296 |
| 9,256,263 B1 * | 2/2016 | Narayanan | G06F 1/3243 |
| 9,489,543 B2 | 11/2016 | Jinaraj et al. | |
| 9,990,020 B2 | 6/2018 | Jain et al. | |
| 10,630,494 B2 | 4/2020 | Labosco et al. | |
| 10,715,341 B2 * | 7/2020 | Yseboodt | H04L 12/40045 |
| 11,012,248 B1 * | 5/2021 | Chen | H04L 12/40045 |
| 11,747,886 B2 * | 9/2023 | Wee | G06F 1/28 |
| | | | 713/320 |
| 2006/0143583 A1 * | 6/2006 | Diab | G06F 1/3209 |
| | | | 713/300 |
| 2007/0110360 A1 | 5/2007 | Stanford | |

(Continued)

*Primary Examiner* — Volvick Derose
(74) *Attorney, Agent, or Firm* — Hewlett Packard Enterprise Patent Department

(57) ABSTRACT

Power-over-Ethernet (PoE) powered devices (PD) may be coupled to a PoE power sourcing equipment (PSE). The PDs may send to the PSE a link-layer protocol communication that comprises an alternative-power field indicating whether the sending PD has an alternative power source (e.g., a battery, a local power supply). The PSE may listen for and receive the communications and read the alternative-power fields thereof. The PSE may set respective power priorities for the PDs based at least in part on whether the PDs have respective alternative power sources, as indicated by the respective alternative-power fields of their communications. The PSE may reduce the power priority of those PDs that have alternative power sources, relative to the priority the PD would otherwise have been given.

20 Claims, 8 Drawing Sheets

(56) References Cited

U.S. PATENT DOCUMENTS

| | | | |
|---|---|---|---|
| 2009/0049316 A1* | 2/2009 | Khatri | G06F 1/3293 713/320 |
| 2009/0217088 A1* | 8/2009 | Diab | G06F 11/2015 714/14 |
| 2009/0235093 A1* | 9/2009 | Diab | G06F 1/30 713/300 |
| 2012/0068534 A1* | 3/2012 | Pan | H02J 4/00 307/26 |
| 2014/0129853 A1 | 5/2014 | Diab et al. | |
| 2014/0215228 A1* | 7/2014 | Choon | G06F 1/266 713/300 |
| 2014/0292070 A1* | 10/2014 | Poh | H04L 12/40045 307/23 |
| 2015/0180276 A1* | 6/2015 | Kanarellis | H04L 12/10 307/66 |
| 2015/0256748 A1* | 9/2015 | Herzel | G06F 1/30 348/372 |
| 2016/0055354 A1* | 2/2016 | Jinaraj | G06F 21/44 726/36 |
| 2016/0269187 A1* | 9/2016 | Zhuang | H04L 12/10 |
| 2017/0010645 A1* | 1/2017 | Jain | G06F 1/266 |
| 2017/0041153 A1* | 2/2017 | Picard | H04L 12/10 |
| 2017/0237575 A1* | 8/2017 | Heath | H04L 12/40045 307/1 |
| 2018/0013319 A1* | 1/2018 | Kanarellis | H02J 7/0024 |
| 2018/0131182 A1* | 5/2018 | Vavilala | H04L 12/10 |
| 2019/0013696 A1* | 1/2019 | Kanarellis | H02J 9/061 |
| 2019/0129485 A1* | 5/2019 | Amano | H04L 12/12 |
| 2020/0159307 A1* | 5/2020 | Roy | G06F 1/28 |
| 2020/0235605 A1* | 7/2020 | Kanarellis | H02J 9/061 |
| 2021/0091966 A1* | 3/2021 | Roy | H04L 12/10 |
| 2021/0173461 A1* | 6/2021 | Sridharan | G06F 1/3209 |
| 2021/0351610 A1* | 11/2021 | Kanarellis | H04L 12/10 |
| 2022/0011841 A1 | 1/2022 | Wee et al. | |
| 2023/0104407 A1* | 4/2023 | Wendt | H04L 12/10 713/340 |
| 2024/0021357 A1* | 1/2024 | Gerhardt | F16M 11/06 |

\* cited by examiner

POWER PRIORITY ADJUSTMENT IN POWER OVER ETHERNET SYSTEM BASED ON AVAILABILITY OF ALTERNATIVE POWER SOURCE

INTRODUCTION

Power-over-ethernet (PoE) allows for data signals and electrical power supply signals to be communicated over the same single ethernet cable. This may allow a PoE-enabled electronic device to be communicably coupled to a network and to receive power via the same cable, which may provide more flexibility in how the device can be deployed (e.g., the device may no longer need to be positioned near a power outlet or have long power cables to reach such an outlet). In a PoE system, a device that provides the power to other devices via PoE is referred to as a Power Sourcing Equipment (PSE) and the devices that receive power from the PSE are referred to as Powered Devices (PD). The PSE generally also serves as a networking element, such as a switch or router. PDs may also be networking elements (e.g., a wireless access point, a PoE repeater/hub, etc.), network end points (e.g., a security camera, an internet-of-things (IoT) device, etc.), or any other electronic device with a PoE port.

In a PoE system, it is possible that under some circumstances the aggregate amount of power that the PSE can supply at a given time ("available power") is less than the aggregate amount of power that all of the connected PDs are consuming or would like to consume ("power demand") at that same time. Power demand exceeding available power of a PSE may be referred herein as a "PSE power fault." A PSE power fault may occur for a variety of reasons. For example, the PSE may be designed such that the maximum aggregate amount of power that the PSE can supply is less than the sum of the per-port maximum power output. For example, if a hypothetical PSE has 80 W maximum aggregate power output and six ports that each individually can supply a per-port maximum of 20 W, and then the sum of the per-port maximum power output (6×20 W=120 W) exceeds the available power (80 W). In such examples, if all of the ports of the PSE are coupled to PDs that consume the full per-port maximum power, then the power demand at that point in time will exceed the available power. As another example, even if the PSE is designed to have a maximum aggregate power output that equals or exceeds the sum of the per-port maximum power output, the actual available power at a given time may drop below the maximum available power in some cases, such as due to a failure of a power supply of the PSE or other failure events.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings.

DETAILED DESCRIPTION

Figure 1:
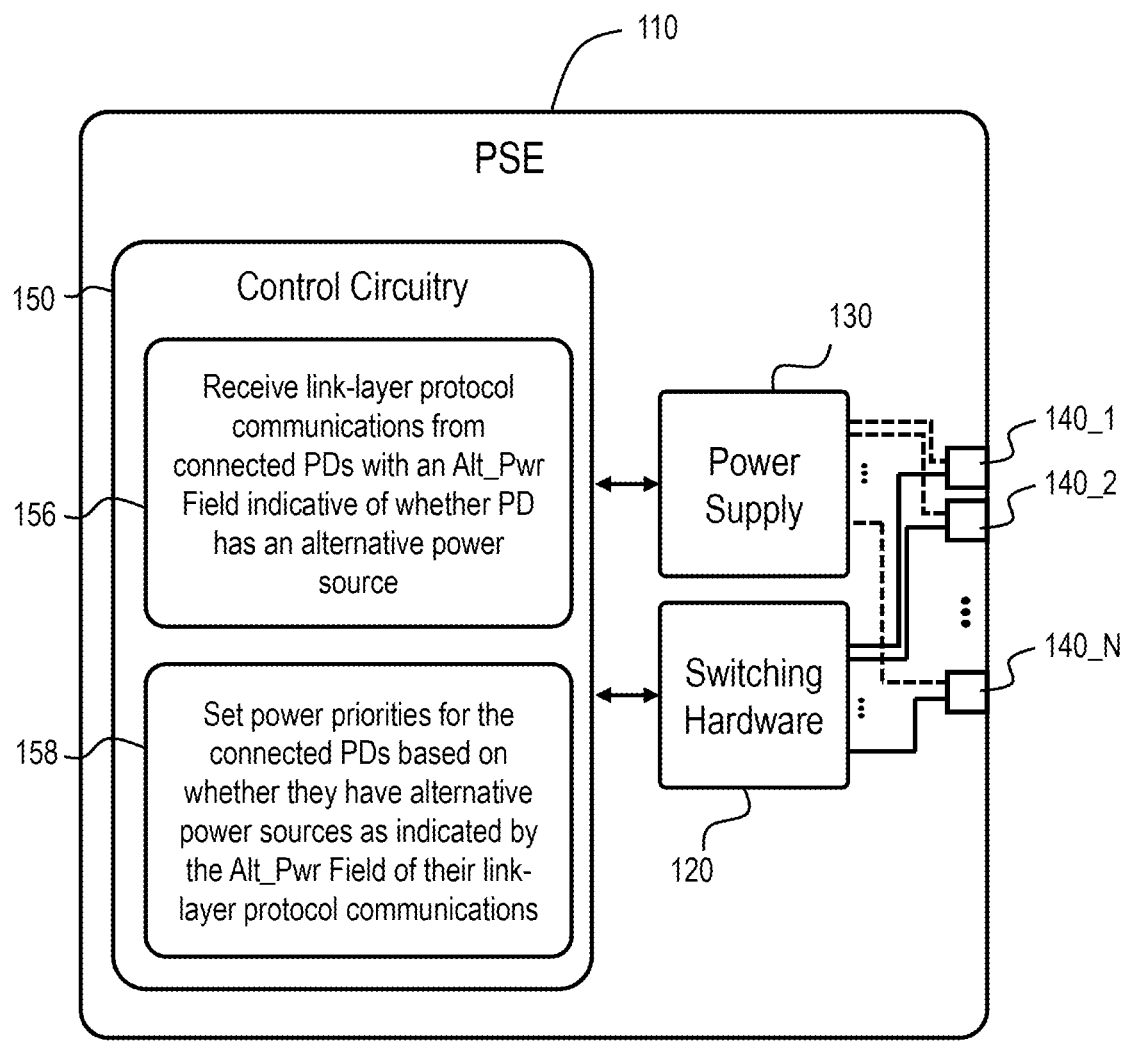
FIG. 1 is a block diagram illustrating an example PoE PSE.

In some PoE systems, a PSE will assign power priorities to the PDs connected thereto. The power priorities dictate which PDs will receive power preferentially in the event of a PSE power fault. That is, when a PSE power fault occurs the PSE will select a first set of PDs that the PSE will continue to supply PoE power and a second set of PDs that the PSE will cease supplying PoE power, with the first set comprising the PDs with higher power priorities and the second set comprising the PDs with lower power priorities relative to the other PDs. The PSE may seek to maximize the number of PDs in the first set that continues to receive PoE power while keeping power demand at or below the available power. For example, the PSE can select the n-highest priority PDs to continue to receive PoE power, where n is the greatest number that will result in the power demand being equal to or lower than the available power. Or, equivalently, the PSE can identify the p-lowest priority PDs to cease supplying PoE power, where p is the lowest number that will result in the power demand being equal to or lower than the available power. Note that "highest" and "lowest" here are relative to the other PDs coupled to the PSE, and not the highest and lowest priorities in an absolute sense. If there are more PDs with the highest priority than can be included in the first set (e.g., if including all of the highest priority PDs would exceed the available power), then one or more of the highest priority PDs will be excluded from the first set. Conversely, if there is additional power headroom available after adding all the PDs with the highest priority of the first set, then the PSE may consider the next highest priority level and continue selecting PDs with that priority, and so on down each tier of power priority in descending order until the number of PDs selected for the first set is maximized while remaining at or below the available power. When the PSE needs to select between two PD's having the same power priority, the PSE may select either PD using any desired selection method, such as a random selection or selection based on any other criterion. Thus, the power priority of a particular PD does not guarantee inclusion or exclusion of the PD from the first set that continues to receive PoE power, but a higher power priority makes it more likely that a PD will be included in the first set that continues to receive PoE power and also ensures that no lower-priority PD will be selected before the higher-priority PD.

In many PoE systems, the power priorities of the PDs have been set based on the self-report of the PDs—i.e., the PDs communicate to the PSE what their priority should be and the PSE will set the power priorities to whatever the PDs indicate. The PDs may be configured, e.g., during manufacture and/or later by a user, to request a particular power priority from the PSE. PDs that are considered to be important or mission critical may be programed to request a high power priority (to make it more likely that they remain powered on in the event of a PSE power fault) and PDs for which down time can be more easily tolerated may be programed to request lower power priorities.

However, in some instances the power priorities, when assigned using the approach described above, may not result in optimal allocation of power among the PDs. In particular, some PDs may have access to alternative sources of power in addition to the power supplied over PoE from the PSE. For example, such alternative power sources may include a battery backup, a local power supply (e.g., a plug or adapter coupled to mains power), a secondary connection to another PSE, or other power sources. If a PD has access to such an alternative power source, then removing the supply of PoE power from the PSE to the PD would not necessarily cause that PD to power down, as the PD would be able to rely on its alternative power source (at least for a period of time). Thus, such a PD does not necessarily need a high power priority to ensure it remains powered on during a PSE power fault. Thus, assigning a high power priority to such a PD can be inefficient in that it may result in another PD that does need the PoE power to remain powered from receiving that power during a PSE power fault.

Examples disclosed herein address the issues noted above by, among other things, configuring the PSE to adjust the power priority of a PD if that PD has access to an alternative power source, more specifically reducing the power priority of that PD below what it would otherwise would have been assigned under a default power priority assignment scheme (default here refers to a power priority assignment scheme used by the PSE without consideration of alternative power sources, such as assigning PDs whatever power priority that they request as described above). Thus, for example, a PD that would have been assigned a HIGH power priority under a default power priority assignment scheme may instead be assigned an adjusted power priority of MEDIUM or LOW if the PD has an alternative power source available. This reduction in the power priority of a PD that has an alternative power source may allow for more PDs to remain powered on in the event of a PSE power fault than otherwise would be possible. This increase in the number of PDs that can remain powered on during a PSE fault may be achieved because the PD with the alternative power source may be removed from the set of PDs that continue to receive PoE power (due to its priority being lowered), which in turn frees up room for the addition to that set of another PD that would otherwise have lost PoE power. Even though the PD with the alternative power source is excluded from the set that receives PoE power, it does not power off because it has the alternative power source. Thus, while the number of PDs that receive PoE power does not change, the total number of PDs that can remain powered on is increased.

For example, consider a hypothetical scenario in which a PSE has 60 W available power and four PDs that consume 20 W each are coupled to the PSE, with the first three PDs (PD1, PD2, and PD3) having a power priority of HIGH and a fourth PD (PD4) having a power priority of MEDIUM. This state constitutes a PSE power fault because available power (60 W) exceeds power demand (4×20 W=80 W). The PSE thus may need to cease supplying PoE power to one of the PDs, in order to bring power demand down to the level of available power. Under prior approaches, the PSE would select the three PDs with the highest priority (PD1, PD2, and PD3) to continue receiving PoE power, and thus would cease supplying PoE power to PD4. Thus, under the prior approach three total PDs would remain powered on and one PD (PD4) would have to power off. However, if PD1 is assumed to have an alternative power source, then in examples described herein the power priority of PD1 may be reduced to MEDIUM. As a result of this change in priority, the PSE can now select PD2, PD3, and PD4 to continue receiving PoE power, with PD1 ceasing to receive PoE power (note that PD1 and PD4 both have the same priority in this case, and thus the PSE can select either one of them). Thus, in this case all four PDs can remain powered, with PD2, PD3, and PD4 receiving PoE power and PD1 receiving power via its alternative power source. Thus, even though the total amount of available power at the PSE is the same and the number of PDs selected to continue receiving PoE power is the same in both of the aforementioned cases, the total number of PDs that can remain powered on is greater in the latter case as a result of adjusting the power priority of the PD that has the alternative power source.

Previously, PSE's have not generally been aware of whether a PD has an alternative power source. Accordingly, in examples disclosed herein, PDs may be configured to communicate this information to the PSEs and the PSEs may be configured to listen for this information and then adjust the power priorities accordingly as described above. In some examples, link-level discovery protocol communications are used for communicating whether a PD has an alternative power source. Examples of link-layer protocols include Link Layer Discovery Protocol (LLDP) and other similar protocols. In particular, in some examples, a new data field is defined within a standardized communication structure of a link-level discovery protocol communication to indicate whether the PD has an alternative power source, for example a new Type-Length-Value (TLV) field in an Ethernet Frame of an LLDP communication. This new data field may be referred to herein as an Alt_Pwr field. In examples disclosed herein, a PD may be configured to include the Alt_Pwr field in their link-layer protocol communications and a PSE may be configured to monitor for such Alt_Pwr fields in the received link-layer protocol communications.

In some examples, in addition to indicating whether or not a PD has an alternative power source in the Alt_Pwr field, a PD may also include information about the alternative power source (if one is present), such as information identifying the type of power source (e.g., battery, local power supply, etc.) and/or an amount of available power or charge state. In some examples, the PSE may be configured to take this additional information into account when determining the power priorities of a PD. For example, the PSE may determine whether the alternative power source is adequate, and if not then the PSE may refrain from reducing the power priority of the PD. In some examples, an alternative power source may be determined to be adequate if the type of power source is one of a predetermined list of power sources, such as a local power supply (e.g., a power adapter) coupled to mains power. As another example, a battery-type power source may be determined as adequate if its charge state is above a predetermined threshold and inadequate if its charge state is below that threshold.

In some examples, the PSE may not only adjust the power priority of some PDs based on whether they have alternative power sources (as indicated by the Alt_Pwr field in communications received from that PDs), but the PSE may also take the presence of an alternative power source into account when selecting PDs to continue to receive PoE power during a PSE power fault. For example, the PSE may select PDs based on their power priority in the manner described above, but when two or more PDs have the same priority and the PSE needs to select between them the PSE may be configured to favor selection of PDs that do not have an alternative power source. Moreover, in some examples, in response to receiving a communication from a PD indicating that the PD has an alternative power source, the PSE may proactively initiate a negotiation with the PD to cease supplying PoE power to the PD without necessarily waiting for a power fault event to occur.

In addition, in some examples, the PSE may occasionally revisit and change the assigned power priorities, for example returning a PD that has an adjusted power priority to a default power priority. For example, the PDs may periodically send updated information about their alternative power sources via additional link-layer discovery protocol communications (via the Alt-Pwr field), and in response to a change in the status of an alternative power source of a PD the PSE may change a power priority of the PD. For example, if a charge state of a battery drops below a threshold value, then the PSE may return the power priority of the PD to the default value. Other events detected through other means may also be used as a trigger to revisit power priorities and reset them to default values.

Turning now to the figures, various devices, systems, and methods in accordance with aspects of the present disclosure will be described.

FIG. 1 is a block diagram conceptually illustrating a PSE for use in a PoE system, in the form of PSE 110. It should be understood that FIG. 1 is not intended to illustrate specific shapes, dimensions, or other structural details accurately or to scale, and that implementations of the PSE 110 may have different numbers and arrangements of the illustrated components and may also include other parts that are not illustrated.

As shown in FIG. 1, the PSE 110 comprises switching hardware 120, a power supply 130, a plurality of PoE ports 140 ("ports 140"), and control circuitry 150.

The switching hardware 120 comprises switching circuitry that can selectively connect the ports 140 to one another and to one or more other ports (not illustrated) such as an uplink port to allow routing of data packets between the various devices connected to the PSE 110, as well as other related components that participate in, control, or otherwise facilitate the communication of the data packets. Switching hardware of a PSE is familiar to those of ordinary skill in the art, and thus the switching hardware 120 is not described in greater detail herein.

The power supply 130 provides electrical power to the PSE 110, which includes power to run the functions of the PSE 110 itself and PoE power that is to be supplied by the PSE 110 to connected PDs via the ports 140. The power supply 130 may be controlled by the control circuitry 150 to selectively supply the PoE power to the ports 140, or in other words the power supply 130 can cease supplying PoE power to certain ports 140 under the direction of the control circuitry 150 if needed (for example, during a PSE power fault). The power supply 130 comprises one or more power supply devices that are configured to receive input power from a source, such as mains power or a power distribution unit, and convert that power into forms suitable for use by the PSE 110. The power supply devices of the power supply 130 may include an AC-to-DC converter, a DC-to-DC converter, protection devices (e.g., over-current protection, over-voltage protection, etc.), and/or other power components that participate in, control, or otherwise facilitate the supply of power to the PSE 110. Power supplies of a PSE are familiar to those of ordinary skill in the art, and thus the power supply 130 is not described in greater detail herein.

The ports 140 comprise PoE capable ports, which may include, for example, RJ45 jacks. Each port 140 is configured to receive a connector of an ethernet cable, which may include an RJ45 connector. Each port 140 is coupled to the control circuitry 150 (e.g., via the switching hardware 120) and is configured to communicate data between the control circuitry 150 and a PD connected to the port 140. Each port 140 is also coupled to the power supply 130 and configured to supply PoE power from the power supply 130 to the PD coupled to port 140 (unless PoE power has been disabled for the port 140 by the control circuitry 150). In FIG. 1 three ports (i.e., ports 140_1, 140_2, 140_N) are shown, but any number of ports 140 equal to or greater than two may be included in the PSE 110. PoE ports are familiar to those of ordinary skill in the art, and thus the ports 140 are not described in greater detail herein.

The control circuitry 150 comprises circuitry configured (e.g., programmed) to perform operations 156 and 158. The control circuitry 150 comprises a processor and a storage medium storing instructions executable by the processor to cause operations 156 and 158 to be performed, dedicated hardware configured to perform operations 156 and 158, or some combination of these. In examples in which the control circuitry 150 comprises a processor, the processor may comprise one or more processing devices capable of executing machine readable instructions, such as, for example, a processor, a central processing unit (CPU), a controller, a microcontroller, a system-on-chip (SoC), a digital signal processor (DSP), a graphics processing unit (GPU), or other processing resources. In examples in which the control circuitry 150 includes dedicated hardware, in addition to or in lieu of the processor, the dedicated hardware may include any electronic device that is configured to perform specific operations, such as an Application Specific Integrated Circuit (ASIC), a Field Programmable Gate Array (FPGA), a Complex Programmable Logic Device (CPLD), discrete logic circuits, a hardware accelerator, a hardware encoder, etc. In some examples, the control circuitry 150 may be configured to control other operations of the PSE 110 in addition to the operations 156 and 158, such as controlling operations of the switching hardware 120, operations of the power supply 130, security/authentication operations, and/or other operations of the PSE 110. Such other operations of control circuitry are familiar to those of ordinary skill in the art, and thus are not described in detail herein.

Operation 156 that the control circuitry 150 is configured to perform comprises receiving link-layer protocol communications from PDs connected to the PSE 110 (via the ports 140), wherein the communications comprise an Alt_Pwr Field indicative of whether the PD that sent the communication has an alternative power source. In particular, the PSE 110 may be configured to monitor for link-layer protocol communications, and when one is received the PSE 110 may examine the Alt_Pwr Field to determine whether the PD that sent the communication has an alternative power source (and to determine other information about the alternative power source, in some examples). In some examples, the link-level discovery protocol is LLDP. Generally, LLDP communications comprise an Ethernet Frame, which is a communication structure comprising a number of data fields formatted and ordered as specified in the LLDP protocol, including, for example, address fields (e.g., destination address, source address), followed by a number of mandatory TLVs (such as a Chassis ID TLV, a Port ID TLV, and so on), followed (optionally) by so-called optional TLVs. Preambles, end fields, and other encapsulation data may also be included. Some optional TLVs may be defined according to an industry standard, such as IEEE Std 802.1AB, while other optional TLVs may be so-called custom TLVs that may be manufacturer specific. In some examples, the Alt_Pwr Field is a new optional TLV of an LLDP frame (which may be either a standards-defined optional TLV or a manufacturer-specific custom TLV). In other examples, the link-level discovery protocol is Cisco Discovery Protocol (CDP), Foundry Discovery Protocol (FDP), Nortel Discovery Protocol (NDP), Link Layer Topology Discovery (LLTD), or other similar link-layer discovery protocols. Such other link-level discovery protocol also define communications data structures, like the Ethernet Frame described above, which comprise various data fields, like the TLVs described above, although the formatting, naming, and other details of the data structures may vary from one protocol to the other. Regardless of which protocol is used, the Alt_Pwr field may be added to the communication structure thereof, either as a new field (if this is allowed by the protocol) or by repurposing an existing field.

Operation 158 that the control circuitry 150 is configured to perform comprises setting power priorities for the connected PDs based on whether they have alternative power sources, as indicated by the Alt_Pwr Field of their link-layer protocol communications (as processed in operation 156). The power priorities may be used by the control circuitry 150 in the manner described above to determine which PDs are to continue to receive PoE power via the ports 140 in the event of a PSE power fault.

The power priorities may include any number of tiers or steps of priorities equal to or greater than two. Moreover, these tiers of priorities may be denoted in any way that is desired. Herein, it is assumed for convenience that the power priorities comprise three tiers denoted HIGH, MEDIUM, or LOW (with HIGH being the highest priority and LOW being the lowest), but one of ordinary skill in the art would understand that any other number of tiers could be used and any other desired scheme for denoting the power priorities could be used, such as numerical values, alphanumeric values, color codes, etc. As used herein, a "higher" priority (or similar terms) is one that makes it more likely for the PD to be selected for the set of PDs that continue to receive PoE power, and vice versa in relation to a "lower" priority. Note that this meaning of "high" and "low" does not necessarily have any relation to high and low in the numerical sense—for example, in some priority schemes a highest priority may be denoted 1 whereas in other priority schemes 1 would be a lowest priority, and in still other schemes priorities have no numerical value at all.

In some examples, setting the power priorities for the connected PDs comprises first determining a default power priority for each PD and then determining adjusted priorities for those PDs that have alternative power sources, where the adjusted priorities are reductions from the default power priorities. PDs that do not have an alternative power source may be assigned their default power priorities. As used herein, a "default power priority" is a power priority determined according to a default power priority determination scheme, which is the scheme that would be used by the PSE 110 to assign power priorities if alternative power sources were not considered. One example of a default power priority determination scheme that the PSE 110 may use is to allow PDs to request a particular power priority and to assign to those PDs a default power priority that is equal to whatever power priority the PD requested. Another default power priority scheme may be, for example, to detect a type of the PD (e.g., from information communicated in the link-layer discovery protocol communication) and assign default power priorities based on the types of the PDs. For example, the control circuitry 150 may consult a specified (predetermined and/or user-configurable) list of PD types with associated priorities to identify the default power priorities for the PDs; PDs of a type not found in the list may be given a power priority specified for unknown PD types.

The degree to which the adjusted power priorities are reduced relative to the default power priorities may vary from one implementation to the next, and in some examples may be a user configurable parameter. In some examples, all PDs that have an alternative power source (or in some cases, all PDs that have an alternative power source deemed to be adequate, as described further below) may have their adjusted power priorities be reduced by a fixed number of tiers (e.g., one tier in some examples) below their default power priority. In some examples, the number of tiers that the adjusted priority is reduced relative to the default priority may vary depending on one or more factors. For example, the number of tiers that the adjusted priority is reduced relative to the default value may vary depending on the tier for the default priority—for example, if the default priority is higher, then the number of tiers reduced may be greater. In other examples, the amount by which a power priority of a given PD is reduced from its default priority may vary from one PD to the next based on characteristics of the PD and/or the type of alternative power source the PD has. For example, a PD with a power source that is considered more reliable, such as local power supply coupled to mains power, may have its power priority reduced more than a PD with a power source that is considered somewhat less reliable, such as a battery backup.

In other examples, setting the power priorities for the connected PDs based on whether they have alternative power sources comprises setting all PDs that have an alternative power source to a specified (e.g., predetermined or user-configurable) priority, which may be lower than a highest power priority. For example, all PDs that have an alternative power source (or in some cases, an alternative power source deemed to be adequate, as described further below) may be set to a LOW power priority. Other PDs that do not have an alternative power source (or that have an inadequate alternative power source) may have their power priorities set using a default power priority scheme, as described above.

In some examples, the above-described process related to adjusting the power priorities of the PDs is performed in response to a PD being connected to the PSE 110. The PD may send an initial link-layer discovery protocol communication as part of a discovery process, and this may trigger performance of the power priority assignment process. For that PD. In other examples, the above-described process for assigning power priorities may be initiated in response to some other condition. That is, the default power priorities may be used for all PDs until the specified condition is met, whereupon some PD's may have their power priorities adjusted as described above. For example, the process for assigning power priorities may be initiated in response the current power demand of the PSE 110 rising above a predetermined and/or user-configurable threshold, such as 85% of available power for example. Thus, when the first few PDs are coupled to a PSE 110 and the power demand is below the threshold, the power priority adjustments described above may be held in abeyance. Then later as more PDs are coupled to the PSE 110 (or as the demand for the current PDs increases) and the threshold is crossed, the PSE 110 may adjust the priorities of the PDs that have alternative power sources as described above.

Once the power priorities of the PDs have been assigned, the control circuitry 150 of the PSE 110 may respond to power fault events in the manner described above. That is, if a power fault event is detected (i.e., power demand exceeds available power), the control circuitry 150 will select a first set of PDs that the PSE will continue to supply PoE power and a second set of PDs that the PSE will cease supplying PoE power, with the first set comprising the PDs with higher power priorities and the second set comprising the PDs with lower power priorities relative to the other PDs. The control circuitry 150 may seek to maximize the number of PDs in the first set that continues to receive PoE power while keeping power demand at or below the available power. For example, the control circuitry 150 can select the n-highest priority PDs to continue to receive PoE power, where n is the greatest number that will result in the power demand being equal to or lower than the available power. Or, equivalently, the control circuitry 150 can identify the p-lowest priority PDs to cease supplying PoE power, where p is the lowest number that will result in the power demand being equal to or lower than the available power. If there are more PDs of the highest priority than can be included in the first set (e.g., if including all of them would exceed the available power), then one or more of the highest priority PDs will be excluded from the first set. Conversely, if there is additional power headroom available after adding all the PDs with the highest priority, then the control circuitry 150 may consider the next highest priority level and continue selecting PDs with that priority until the number of PDs in the first set is maximized while remaining at or below the available power. When the control circuitry 150 needs to select between two PD's having the same power priority, the control circuitry 150 may select either PD using any desired selection method, for example by preferentially selecting PDs that do not have alternative power sources. To cease the supply of PoE power to the PDs in the second set, the control circuitry 150 may disable PoE power supply for the ports 140 that are connected to those PDs (note that data communications may still continue to flow through these ports, however, as if they were standard Ethernet ports).

In addition to the operations described above, in some examples the control circuitry 150 of the PSE 110 may be configured to perform any of the operations described below in relation to the methods 400, 500, 600, and/or 900 of FIGS. 4-6 and 9. Certain aspects of the PSE 110 are further elucidated in FIG. 3, which depicts a PoE system in which the PSE 110 may be deployed. FIG. 3 is described below following the description of FIG. 2.

Figure 2:
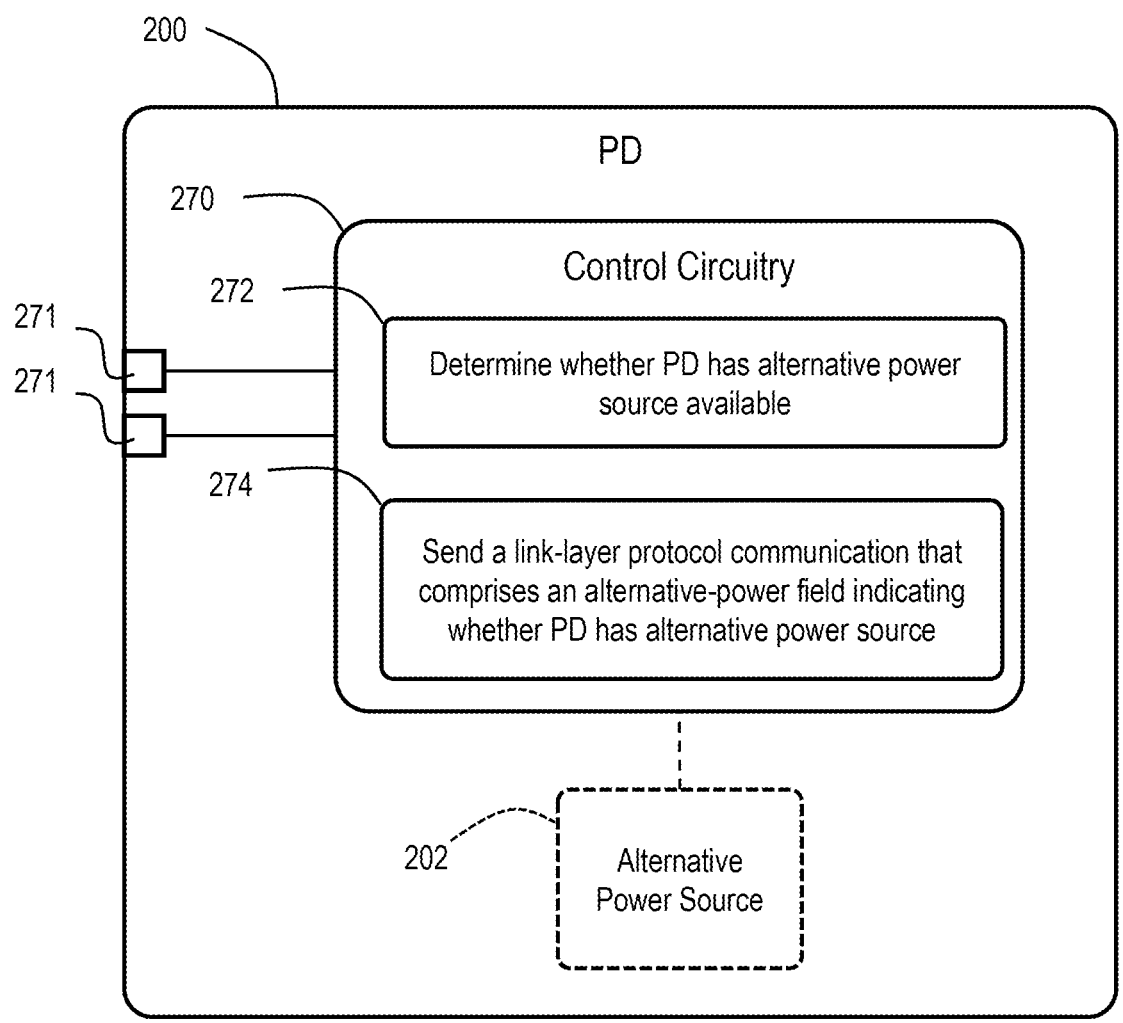
FIG. 2 is block diagram illustrating an example PoE PD.
Figure 3:
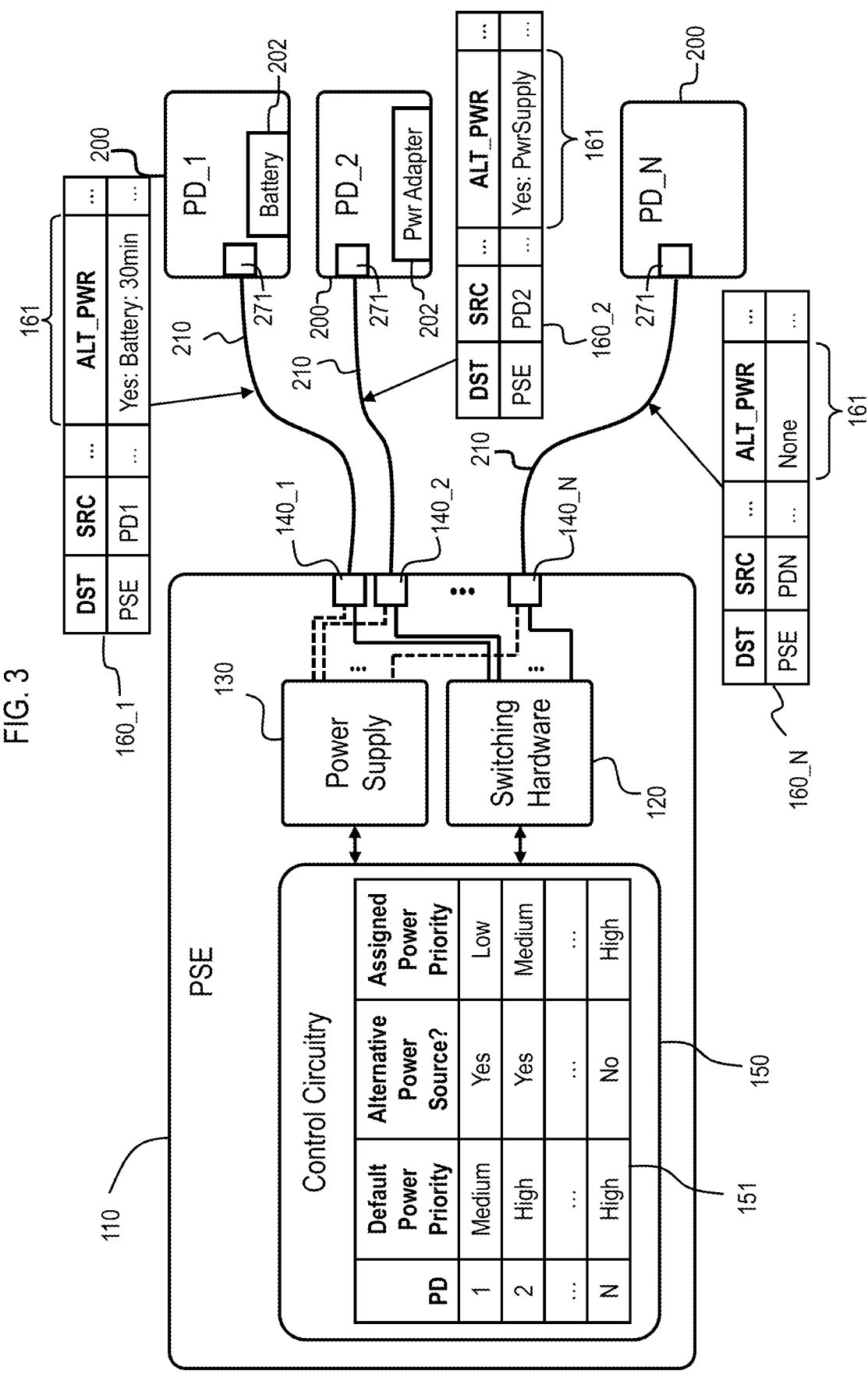
FIG. 3 is a block diagram illustrating an example PoE system comprising a PSE and PDs coupled thereto.

Turning now to FIG. 2, a PD for use in a PoE system will be described, in the form of PD 200. FIG. 2 is a block diagram conceptually illustrating the PD 200. It should be understood that FIG. 2 is not intended to illustrate specific shapes, dimensions, or other structural details accurately or to scale, and that implementations of the PD 200 may have different numbers and arrangements of the illustrated components and may also include other parts that are not illustrated.

As shown in FIG. 2, the PD 200 comprises control circuitry 270 and one or more ports 271. The PD 200 may also optionally comprise an alternative power source 202. The PD 200 may be any PoE capable electronic device, such as networking devices (e.g., wireless access points), IP telephones, IP security cameras, laptops, computer monitors, sales kiosks, sensors, other IoT devices, or any other PoE-capable electronic device.

The ports 271 comprise PoE capable ports, which may comprise RJ45 jacks. Each port 271 is configured to receive a connector of an ethernet cable, which may comprise an RJ45 connector. This allows the PD 200 to be coupled to a PSE, such as the PSE 110 described above. The ports 271 are configured to receive PoE power and supply the power to the other components of the PD 200. The ports 271 are also communicably coupled with the control circuitry 270 to communicate data between the control circuitry 270 and another device (such as a PSE) connected to the port 271. In FIG. 2 two ports 271 are shown, but any number of ports 271 equal to or greater than one may be included in the PD 200. Some PDs 200 have only one port 271. Others may have two ports 271 to allow the PD to be coupled to multiple networking devices (e.g., multiple PSEs), for example to provide redundancy. The PD 200 could also have more than two ports 271. As noted above, PoE ports are familiar to those of ordinary skill in the art, and thus the ports 271 are not described in greater detail herein.

The control circuitry 270 comprises circuitry configured (e.g., programmed) to perform operations 272 and 274. The control circuitry 270 comprises a processor and a storage medium storing instructions executable by the processor to cause operations 272 and 274 to be performed, dedicated hardware configured to perform operations 272 and 274, or some combination of these. In this context, processor and dedicated hardware may include any of the examples discussed above in relation to the control circuitry 150. In some examples, the control circuitry 270 may be configured to control other operations of the PD 200 in addition to the operations 272 and 274, such as operations controlling communication of the PD 200 with the PSE (which may share commonalities among all types of PDs 200) as well as other operations that may be more specific to the functions of the various types of PD 200. Because the PD 200 can be any of a variety of devices with widely varying functions, the other operations performed by the control circuitry 270 may vary from one device to another. These other operations of PDs would be familiar to those of ordinary skill in the art and are not described herein.

Operation 272 comprises determining whether the PD 200 has an alternative power source 202 present/available. The alternative power source 202 is optional, and some instances of the PD 200 may have the alternative power source 202 while others do not. Regardless of whether the PD 200 has the alternative power source 202, the PD 200 is configured to perform operation 272 to check whether it has the alternative power source 202. As used herein, the PD 200 has the alternative power source 202, or the alternative power source 202 is "present" or "available" if the alternative power source 202 is in a state capable of supplying power to the PD 200. This is in contrast to merely having components present that could potentially provide power but which are not currently capable of so doing. For example, a PD 200 that has a power cord plugged into mains power may determine that this is an alternative power source 202 that is present/available, but the PD 200 may determine that the power cord is not an alternative power source if the power cord is unplugged from any power source. The alternative power source 202 need not necessarily be currently supplying power to the PD 200 for the PD 200 to consider the alternative power source 202 as being present/available, but the power source should be in a state where it is energized and capable of supplying power if called upon to do so. Examples of alternative power sources include batteries (whether integral to the PD 200 or as an external unit that is plugged into the PD 200), local power supplies (e.g., power cords, adaptors, or chargers plugged into a power source (e.g., mains), a wireless charger, or any other external power source (other than the PoE power from the PSE). In some examples, if the PD 200 has two PoE connections to two distinct PSEs, the PD 200 may also determine that this constitutes an alternative power source 202 (i.e., one PSE would count as the alternative power source in relation to the other PSE, and vice versa), as long as both connections are configured to supply PoE power to the PD 200; if, however, one of the PSEs is configured to supply data only to the PD 200, then the PD 200 may determine that it does not have an alternative power source 202.

The control circuitry 270 may detect whether an alternative power source is available by any of a variety of means. For example, some PD 200 due to their design may be incapable of having any alternative power source 202 other than having multiple PoE connections (in examples where that can be considered as an alternative power source). This may be the case, for example, because the PD does not have any power receiving components other than the ports 271, such as a battery, power cord, power jacks, or the like. In such a PD, the control circuitry 270 may be programmed (e.g., at manufacture or during configuration) to automatically identify that it does not have an alternative power source, or in examples where PoE connections to multiple PSEs is considered as being an alternative power source, then the control circuitry 270 may be programmed to check for this as well. In particular, in examples where having PoE connections to multiple PSEs is considered as an alternative power source, then the PD 200 may be made aware of this via PoE circuitry that is included in the PD 200 to manage the PoE ports 271—this PoE circuitry may be part of the control circuitry 270, or separate circuitry which the control circuitry 270 can communicate with to determine if multiple PoE connections are present. In other PDs 200 which do have one or more components that could possibly allow for alternative power (e.g., a battery, power plug, power jack, wireless charging circuit, etc.), then power management/budgeting circuitry (not illustrated) may be provided to monitor and/or control the power supplied from these sources and the control circuitry 270 may be configured to query such power management circuitry to determine whether the alternative power source 202 is currently energized and capable of providing power; if so, then this is identified as an alternative power source 202 that is present/available, and if not then it is not identified as an available/present alternative power source 202. Such power management/budgeting circuitry is generally included in any PD that has power receiving components (such as a battery, power cord, etc.) to monitor and control the flow of power from or through those components, and is familiar to those of ordinary skill in the art. Alternatively, or in addition, the control circuitry 270 may be configured to directly sense whether power is present from an alternative power source 202, for example via a sensor (not illustrated), such as a current sensor, coupled to a system power bus or other power line that receives the power from the alternative power source 202. As another example, a PD 200 that has (or is configured to receive) a battery will also be provided with a battery charging/management circuit, and the control circuitry 270 can query this battery charging/management circuit to determine if the battery is installed and if so what the charge state of the battery is.

Operation 274 comprises sending a link-layer protocol communication to the PSE that comprises an Alt_Pwr field indicating whether PD has alternative power source. In some examples, both PDs 200 that have an alternative power source 202 and PDs 200 that do not have an alternative power source 202 include the Alt_Pwr field in their link-layer protocol communication, with the PDs 200 that do not have an alternative power source 202 indicating this in the Alt_Pwr field. In other examples, a PD 200 that does not have an alternative power source 202 may omit or send a blank Alt_Pwr field to indicate that it does not have an alternative power source 202. In some examples, the link-level discovery protocol is LLDP and the Alt_Pwr Field is a TLV of an LLDP Ethernet frame defined (either by a manufacture or by a standard) for the purpose of communicating whether the PD has alternative power source. In other examples, the link-level discovery protocol is CDP, Foundry Discovery Protocol (FDP), Nortel Discovery Protocol (NDP), Link Layer Topology Discovery (LLTD), or other similar link-layer discovery protocols, and in any of these examples the Alt_Pwr field may comprise a new field added to a communication of one of these protocols. In some examples, the link-layer protocol communication that is sent by the PD 200 may be a communication that is sent by the PD 200 during a discover operation, e.g., when the PD 200 is first plugged into the PSE (or when communication is resumed after a failure) and the PD 200 is identifying itself to the PSE. The link-layer protocol communication may serve multiple purposes, for example, providing discovery information about the PD 200 to the PSE in addition to providing the information contained in the Alt_Pwr field. The link-layer protocol communication may be sent more than one time. For example, it may be sent upon initial connection for the PD 200 to the PSE 110 and/or periodically thereafter at specified intervals. In addition, in some examples, the PD 200 may send a communication in response to detection of a particular condition, such as a change in the status of their alternative power source.

In some examples, the control circuitry 270 may also include in the Alt_Pwr field information identifying a type of the alternative power source. In some examples, if the alternative power source is a battery, then the control circuitry 270 may also include in the Alt_Pwr field information about the charge state of the battery, such as a charge level, estimated running time on battery, or any other information related to the amount of charge stored in the battery.

Turning now to FIG. 3, a PoE system, in the form of system 100, is described. The system 100 comprises the PSE 110, which was described above. The system 100 also comprises multiple distinct instances of the PD 200 described above. Some aspects of the PSE 110 and PDs 200 that were described above are not shown in FIG. 3. In addition, descriptions of certain aspects shown in FIG. 3 that were already described above in relation to FIGS. 1 and 2 may be omitted below.

As shown in FIG. 3, the PDs 200 are coupled to the PSE 110. In FIG. 3, three PDs 200 are illustrated, labeled PD_1, PD_2, and PD_N. But it should be understood that any number from 1 to N of PDs 200 may be coupled to the PSE 110, where N is the number of ports 140 of the PSE 110 (N being equal to or greater than 2). The PDs 200 are communicably coupled to the PSE 110 via respective Ethernet cables 210, which are plugged into the ports 140 of the PSE 110 and the ports 271 of the PDs 200.

As shown in FIG. 3, the PDs 200 each send a link-layer protocol communication 160 to the PSE 110 (for example, as part of a discovery process). The PD 200 labeled PD_1 sends the communication 160_1, PD_2 sends the communication 160_2, and so on up to PD_N which sends the communication 160_N. Each of the communications 160 comprises a series of fields, as defined by the link-layer discover protocol, including an Alt_Pwr field 161. For example, in FIG. 3 the communications 160 are shown as comprising a destination address field labeled DST in the figure, a source address field labeled SRC in the figure, and the Alt_Pwr field 161. It should be understood that the communications may include multiple other fields, which are not illustrated herein for the sake of clarity. The Alt_Pwr fields 161 indicate whether the respective PD 200 that sent the communication has an alternative power source 202. In the example of FIG. 3, the PDs 200 labeled PD_1 and PD_2 have alternative power sources 202 (in the form of a battery and a power adapter, respectively), and thus the Alt_Pwr fields 161 in the communication 160_1 and 160_2 indicate "Yes" (i.e., that an alternative power source 202 is present). The PD 200 labeled PD_N, on the other hand, does not have an alternative power source and thus the Alt_Pwr field 161 in the communication 160_N indicates "None". The values of the communications 160 are illustrated as words in the figure (such as "Yes" or "None") to facilitate understanding, but in practice the actual values may be encoded in a machine readable format, such as binary. In addition, in some examples, the Alt_Pwr field 161 may communicate information about the power source 202 when present, such as a type of power source and a charge state (in the case of a battery). Thus, in some examples, the communication 160_1 may also indicate that the power source 202 of PD_1 is a battery and its charge state (in FIG. 3, this is indicated as an amount of time that the PD can operate, but it could be provided in other terms, such as a raw charge amount (watt*hours), percent of total charge, etc.), and communication 160_2 may also indicate the power source 202 of PD_2 is a local power supply connected to mains power (e.g., via a power adapter).

The PSE 110 receives the communications 160 and may determine power priority based on the Alt_Pwr fields 161 thereof. For example, as shown in table 151, the control circuitry 150 may record which PDs 200 have alternative power sources 202, as indicated by the Alt_Pwr fields 161 of the communications 160. The control circuitry 150 knows which communications 160 came from which PDs 200 due to which respective ports 140 the communications were received on and/or due to the SRC field (in examples where such a field is provided in the communication 160). The control circuitry 150 may also determine default power priorities for each of the PDs, ad described above. Hypothetical values of the default power priorities for the PDs 200 are shown in the table 151. Based on the default power priorities and whether the PDs 200 have alternative power sources 202, the control circuitry 150 may determine assigned priorities for the PDs 200. The assigned power priorities may be adjusted (e.g., reduced) relative to the default power priorities for those PDs 200 that have alternative power sources 202, as described above. In the example illustrated in FIG. 3, the adjusted power priorities of PDs 200 that have alternative power sources 202 are reduced by one tier relative to the PD's 200 default power priority. Thus, as shown in the table 151, because the PDs 200 labeled PD_1 and PD_2 have alternative power sources 202, the control circuitry 150 control circuitry may reduce their power priorities such that PD_1 is assigned a LOW power priority (adjusted down from its MEDIUM default power priority) and PD_2 is assigned a MEDIUM power priority (adjusted down from its HIGH default power priority). On the other hand, because the PD_N has no alternative power source 202, its assigned power priority remains the same as its default power priority, in this case HIGH. (The "adjusted power priority" as used herein refers to an assigned power priority which has been adjusted relative to a default power priority). In some examples, the control circuitry 150 may store some or all of the above-described information in a data structure such as table 151. In other examples, the control circuitry 150 may determine or use the information as needed and may store some or all of it, but not necessarily all in the same data structure or in the same format as shown in table 151. In some examples, additional information may also be stored, such as type of power source, charge state, etc.

In some examples, the system may keep a record of the default power priorities for all of the PDs, including the PDs which have had their power priority adjusted. The PSE 110 may occasionally revisit the power priority assignments, and may decide that a given PD 200 should have its power priority reset to its default value. Thus having the record of the default power priorities for all of the PDs 200 may facilitate such resetting of the power priority. The power priorities may be reset, for example, in response to an event that negatively affects the ability of the alternative power source to power the PD 200. For example, such events may include a battery charge state falling below a threshold, a secondary PoE connection to another PSE having its power output reduced, a local power supply being unplugged or having a failure, or other similar events that might affect the ability of the alternative power source to provide power. These events may be communicated to the PSE 110 via the Alt_Pwr field of link-layer protocol communications, in some examples. For example, link-layer protocol communications may be periodically sent from PDs 200 to the PSE 110, and the PDs 220 may include status updates regarding their alternative power sources in these communications.

With continued reference to FIG. 3, suppose that a power fault event occurred and that the PSE 110 was only able to supply power to a subset of the PDs 200. In this case, the control circuitry 150 of the PSE 110 may select a subset of PDs 200 from among those having the highest priority to which it will continue to supply PoE power, and may cease supplying PoE power to the remaining PDs 200. Because the assigned priorities of PD_1 and PD_2 were reduced, it is less likely that they will be selected to continue to receive PoE power, whereas PD_N will be more likely to be selected to receive PoE power.

For example, if it is assumed that only PD_1, PD_2, and PD_N are present and that only one PD 200 can be supplied PoE power, then PD_N would be selected to continue receiving PoE power because it has the highest priority (HIGH) out of the three connected PDs 200. Thus, all three PDs 200 will remain powered on, with PD_N receiving PoE power and PD_1 and PD_2 being powered by their alternative power sources 202. In contrast, if the same scenario is considered but without the power priorities having been adjusted, then there is a risk that PD_2 may be selected for receiving PoE power instead of PD_N (since both PD_2 and PD_N have the HIGH default power priority), and in that case PD_N would be powered down. Thus, by adjusting the power priorities of the PDs 200 that have alternative power sources 202, the number of PDs 200 that can remain powered on during the PSE power fault may be increased relative to a scenario in which the power priorities were left at their default values.

Turning now to FIGS. 4, 5, 6, and 9 example methods 400, 500, 600, and 900 will be described. The methods 400, 500, 600, and 900 may be performed, for example, by a PSE, such as the PSE 110 described above. In particular, in some examples, the methods 400, 500, 600, and/or 900 may be performed by control circuitry 150 of the PSE 110. In some examples, the control circuitry 150 comprises a computer readable storage medium storing instructions corresponding to the operations of methods 400, 500, and/or 600 i.e., instructions configured to cause the PSE 110 to perform the methods 400, 500, 600, and/or 900 when executed by a processor of the control circuitry 150. In some examples, the control circuitry 150 comprises a dedicated hardware configured to perform the methods 400, 500, 600, and/or 900. In some examples, the control circuitry 150 is configured to perform the methods 400, 500, 600, and/or 900 by a combination of a processor executing instructions and dedicated hardware.

Figure 4:
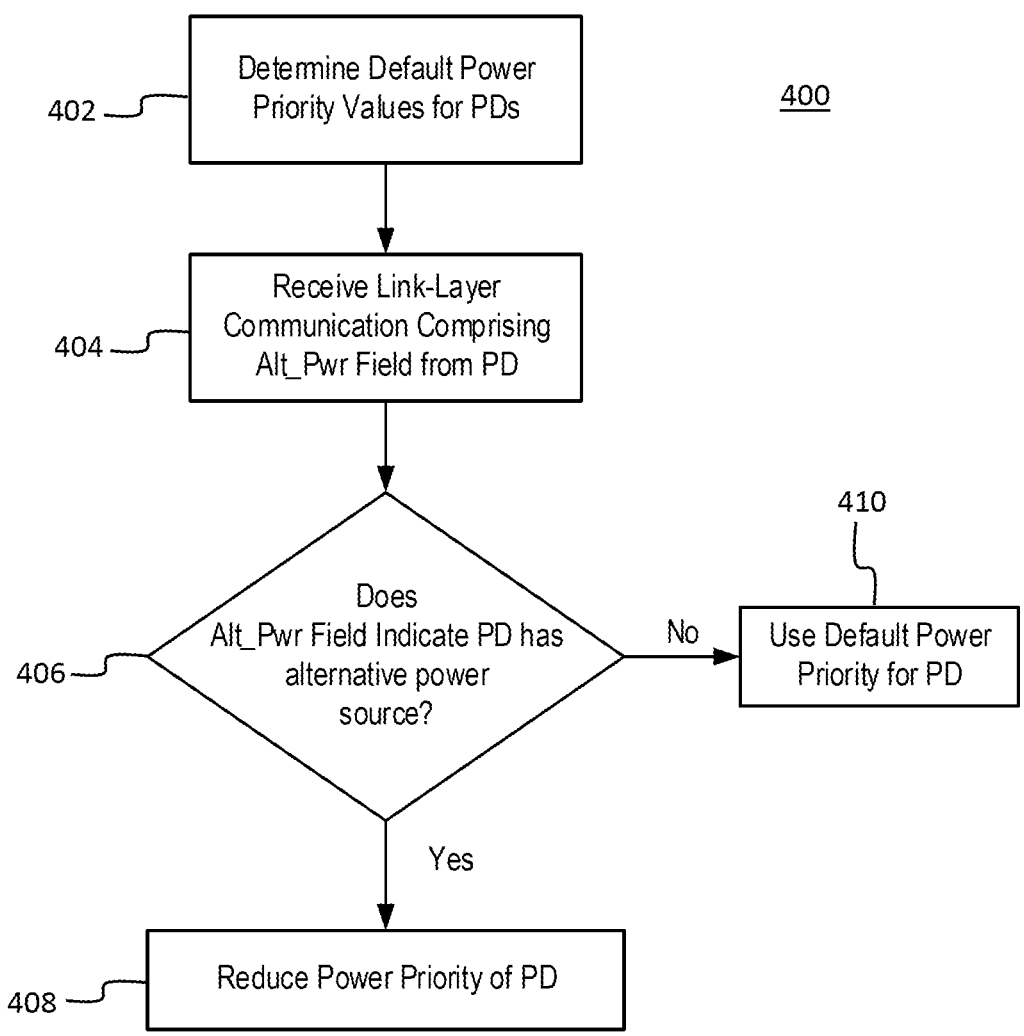
FIG. 4 is a process flow chart illustrating a first example method performable by a PoE PSE.

As shown in FIG. 4, the method 400 comprises operations of blocks 402, 404, 406, 408, and 410, which are described in greater detail below.

In block 402, the PSE determines default power priorities for each of the connected PDs. The default power priorities are the power priorities that would be assigned to each PD using a default power priority allocation scheme, such as assigning each PD the power priority requested by the PD. The default power priorities correspond to the power priorities that would be assigned to each PD if alternative power sources are not considered, i.e., if each PD were assumed to not have an alternative power source. Although illustrated first for ease of description, block 402 is not necessarily performed first; for example, block 402 may be performed at any time prior to, or concurrently with, block 408.

In block 404, the PSE receives a link-layer protocol communication comprising an Alt_Pwr field from a connected PD. In some examples, the communication received in block 404 may be part of a discovery process that is performed when a PD first connects (or reconnects after a disconnection or failure event) to the PSE. In other examples, the communication received in block 404 may be a subsequent communication; for example, PDs may send link-layer discovery protocol communications periodically to the PSE and block 404 may comprise one such communication.

In block 406, the PSE determines whether the Alt_Pwr field indicates the PD that sent the communication has an alternative power source. If the Alt_Pwr field indicates the PD does have a power source (Block 406 determination=Yes), the method continues to block 408. If the Alt_Pwr field indicates the PD does not have a power source (Block 406 determination=No), then the method continues to block 410.

In block 408, the PSE reduces the power priority of the PD relative to the default power priority determined in block 402. In other words, the PSE determines an adjusted priority for the PD, which is lower than the default priority, and assigns the adjusted priority as the power priority for the PD.

In block 410, the PSE uses the default priority determined in block 402 as the power priority for the PD. In other words, the assigned power priority for the PD equals the default power priority.

In some examples, blocks 404 through 410 may be repeated for each PD coupled to the PSE until all PDs have been assigned power priorities.

In some examples, block 406 and/or 408 may be performed directly after block 404. In other examples, after block 404 is completed the PSE may wait to perform block 406 and/or block 408 until some other condition is satisfied. For example, in some implementations the aforementioned condition may be that a current power demand of the system exceeds (or equals) some threshold amount (which may be predetermined or user-configurable). In implementations in which blocks 406 and/or 408 are delayed until another condition is satisfied, the PDs may be assigned their respective default power priorities, as determined in block 402, in the meantime, and then when blocks 406 and 408 are eventually performed the power priorities determined in those blocks may override the initially assigned power priorities.

Figure 5:
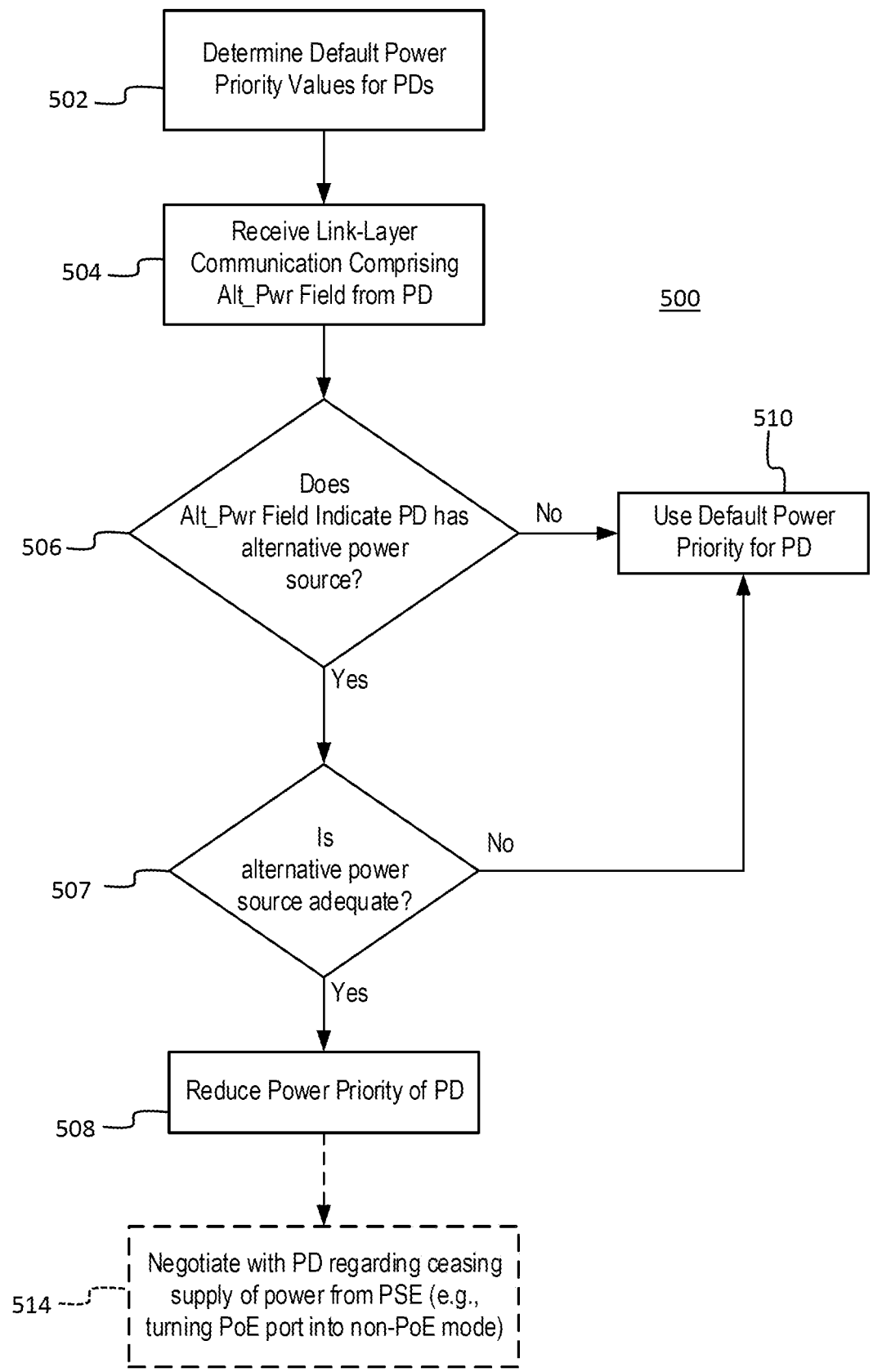
FIG. 5 is a process flow chart illustrating a second example method performable by a PoE PSE.

As shown in FIG. 5, the method 500 comprises operations of blocks 502, 504, 506, 507, 508, and 510. The method may also optionally include the operations of block 514. The method 500 comprises a modification of the method 400. In particular, the operations of blocks 502, 504, 506, 508, and 510 may be similar to the operations of blocks 402, 404, 406, 408, and 410 described above, but the method 500 differs from the method 400 by the addition of block 507 between the blocks 506 and 508 and the addition (optionally) of block 514 after block 508.

In block 502, the PSE determines default power priorities for each of the connected PDs. Although illustrated first for ease of description, block 502 is not necessarily performed first; for example, block 502 may be performed at any time prior to, or concurrently with, block 508.

In block 504, the PSE receives a link-layer protocol communication comprising an Alt_Pwr field from a connected PD. As noted above, the communication may be part of an initial discovery process or a later communication.

In block 506, the PSE determines whether the Alt_Pwr field indicates the PD that sent the communication has an alternative power source. If the Alt_Pwr field indicates the PD does have a power source (Block 506 determination=Yes), the method continues to block 512. If the Alt_Pwr field indicates the PD does not have a power source (Block 506 determination=No), then the method continues to block 510.

In block 507, the PSE determines whether the alternative power source of the PD, as indicated in the Alt_Pwr field, is adequate. In some examples, determining whether the alternative power source is adequate comprises determining a type of the alternative power source. In particular, in these examples the Alt_Pwr field may indicate not only whether the PD has an alternative power source, but also a type of the alternative power source. In some examples, the types of alternative power sources that can be indicated by the Alt_Pwr field include: battery, a local power supply connected to an external power source (e.g., mains power) via power cord, power adapter, or the like, and another PoE connection to another PSE (other than the PSE performing the method 500). In some examples, types of power sources could be indicated with even greater granularity than that mentioned above; for example different subtypes of local power supplies could be identified as distinct types, such as power cord, adapter, wireless charger, and so on. In some examples, once the PSE knows the type of the alternative power source, the PSE may determine whether the alternative power source is adequate based on the type, for example by consulting a specified (predetermined and/or user-configurable) list of types of alternative power sources that are considered to be adequate.

In some examples, in addition to or in lieu of determining a type of the alternative power source, determining whether the alternative power source is adequate may include determining whether an amount of power supplied by the power source is enough. In such examples, the Alt_Pwr field may indicate the amount of power supplied by the alternative power source. The amount of power supplied may be compared to a predetermined threshold value and the alternative power source may be adequate if the power supplied exceeds the threshold. The threshold may be a generic threshold that is the same for all PDs (e.g., equal to a per-port maximum power output of the PSE or some other predetermined or user-configurable value), or the threshold may vary from one PD to the next based on its power needs, which the PDs may communicate to the PSE during discovery or thereafter. In some examples, certain types of alternative power source may be presumed to be adequate, such as a mains power connection for example, and thus the indication of an amount of power supplied may be omitted in such cases, whereas types of power sources that may sometimes be adequate and sometimes not, such as another PoE connection for example, may go through the above-described procedure of comparing amount of power supplied to the threshold. One example of how it can be determined whether the alternative power source is adequate is described in greater detail below with reference to FIG. 6.

If the alternative power source is adequate (Block 507 determination=Yes), the method continues to block 508. If the alternative power source is not adequate (Block 507 determination=No), then the method continues to block 510.

In block 508 the PSE reduces the power priority of the PD relative to the default power priority determined in block 502.

In block 510 the PSE uses the default priority determined in block 502 as the power priority for the PD.

In some examples, blocks 504 through 510 may be repeated for each PD coupled to the PSE until all PDs have been assigned power priorities.

In some examples, the method 500 optionally includes the additional operations of block 514. In block 514, the PSE may begin negotiations with the PD to cease supplying PoE power to the PD. This may constitute a proactive disabling of PoE power to the PD which is separate and apart from any PSE power fault event. This may, in some circumstances, allow a PSE power fault to be avoided in the first place, rather than waiting for one to happen and then reacting to it. In some examples, the PSE merely requests that the PD accept having the PoE power ceased, but the PD can reject this request (in contrast to when a PSE fault event occurs, in which case the PSE determines on its own which PDs to continue supplying PoE power to and which to cut off). In some examples, the negotiation of block 514 may be performed in response to the type of the alternative power source being a member of a list of certain power sources (e.g., a same list of power sources mentioned above in block 507, or a different list). In other words, in some examples such negotiations are performed only for PDs that have some types of alternative power sources. In other examples, the negotiations may be performed for any PD that is determined to have an adequate power source in block 506. In still other examples, block 514 is omitted. In some examples, block 514 is performed after block 508, as shown, but in other examples, block 514 could be performed between block 507 and block 508 or simultaneously with block 508.

As noted above in relation to blocks 406 and 408 of the method 400, in some examples, blocks 506-514 may be performed directly in response to block 504 without waiting for another condition to be satisfied, or in other examples performance of some or all of these blocks 506-514 may be delayed until another condition is satisfied (such as, for example, the power demand exceeding a threshold).

Figure 6:
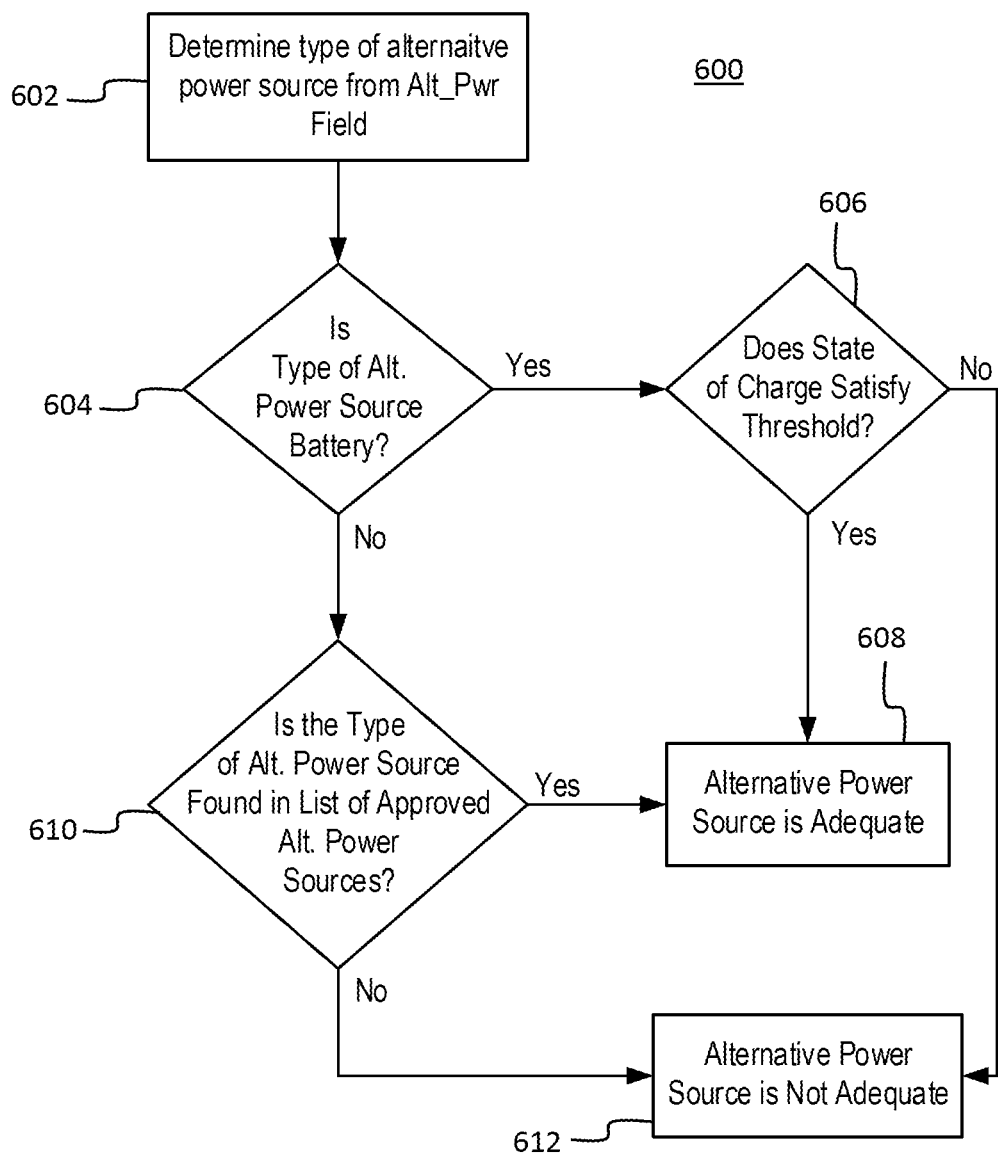
FIG. 6 is a process flow chart illustrating a third example method performable by a PoE PSE.

As shown in FIG. 6, the method 600 comprises operations of blocks 602, 604, 606, 608, 610, and 612. The method 600 may be used in block 507 of the method 500 as one example of how it may be determined whether the alternative power source is adequate.

In block 602, the PSE determines the type of alternative power source that is indicated in the Alt_Pwr field.

In block 604, the PSE determines if the type of alternative power source is battery. If the alternative power source is a battery (block 604 determination=Yes), then the method continues to block 606. If the alternative power source is not a battery (block 604 determination=No), then the method continues to block 610.

In block 606, the PSE determines if a charge state of the battery, as indicated by the Alt_Pwr field, satisfies a threshold (e.g., exceeds the threshold in some examples, or equals/exceeds the threshold in some examples). The charge state may be indicated as a raw amount of charge (e.g., Watt*hours), as a percentage of full charge, as an estimated run time of the PD on the battery, or as any other convenient metric for measuring or characterizing the amount of charge in the battery. The threshold may be a predetermined value, a user configurable value, or both (e.g., the threshold may start as a predetermined value that a user can then change). If the state of charge satisfies the threshold (block 606 determination=Yes), then the method continues to block 608. If the state of charge does not satisfy the threshold (block 606 determination=No), then the method continues to block 612.

In block 608, the PSE identifies the alternative power source as being adequate.

In block 610, the PSE determines if the type of the alternative power source, as indicated by the Alt_Pwr field, is found in a list of approved alternative power sources. The list of approved power source may include, for example, power source types that are considered as reliable and/or capable of fully powering the PD, such as local power supply connected to mains power (e.g., via power cord, adapter, wireless charger, etc.). The list of approved power sources may be predetermined (e.g., specified by a manufacturer) and/or user configurable. If the type of alternative power source type is found in the list (block 610 determination=Yes), then the method continues to block 608. If the type of alternative power source type is not found in the list (block 610 determination=No), then the method continues to block 612.

In block 608, the PSE identifies the alternative power source as not being adequate.

Thus, the method 600 will identify as adequate: (a) batteries that have a sufficient state of charge (blocks 604→606→608), or (b) other types of power sources that are found in the approved list of power sources (blocks 604→610→608). On the other hand, the method 600 will identify as not adequate: (c) batteries that have an insufficient state of charge (blocks 604→606→612), or (d) other types of power sources that are not found in the approved list (blocks 604→610→612).

Figure 7:
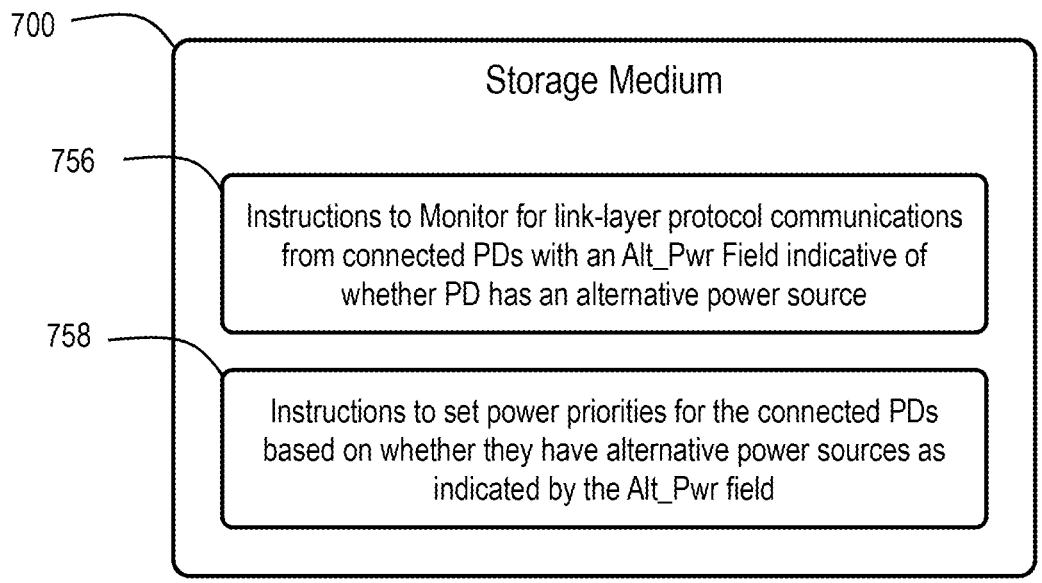
FIG. 7 is a block diagram illustrating an example storage medium storing instructions executable by a processor of a PoE PSE.

Turning now to FIG. 7, an example non-transitory computer readable storage medium 700 (storage medium 700) is described. The storage medium 700 stores instructions 756 and 758, which are executable by a processor of a PSE (e.g., a processor of control circuitry 150 of PSE 110) to cause the PSE to perform various operations described herein. In some examples, the storage medium 700 is part of a PSE, such as the PSE 110. For example, in some implementations the storage medium 700 is part of the control circuitry 150, and the control circuitry 150 further comprises a processor coupled to the storage medium 700 and configured to read and execute the instructions 756 and 758. In some implementations, the storage medium 700 may be provided as a computer program product that is, at least initially, separate from a PSE. The computer program product may be usable to program a PSE to perform operations associated with the instructions 756 and 758 by, for example, transmitting the instructions 756 and 758 from the storage medium 700 to the PSE, either for copying to local storage on the PSE or for immediate execution by the PSE.

The instructions 756 comprise instructions to monitor for link-layer protocol communications from connected PDs with an Alt_Pwr Field indicative of whether PD has an alternative power source. For example, the instructions 756 may include instructions to perform the operations 156 and other associated operation as described above in relation to the PSE 110. The instructions 756 may also include operations described above in relation to blocks 404 and 504 of the methods 400 and 500.

The instructions 758 comprise instructions to set power priorities for the connected PDs based on whether they have alternative power sources as indicated by the Alt_Pwr field. For example, the instructions 758 may include instructions to perform the operations 158 and other associated operations described above in relation to the PSE 110. The instructions 758 may also include operations described above in relation to blocks 402, 406, 408, and 410 of the method 400, blocks 502, 506, 507, 508, and 510 of the method 500, and/or blocks 602 to 612 of the method 600.

Figure 8:
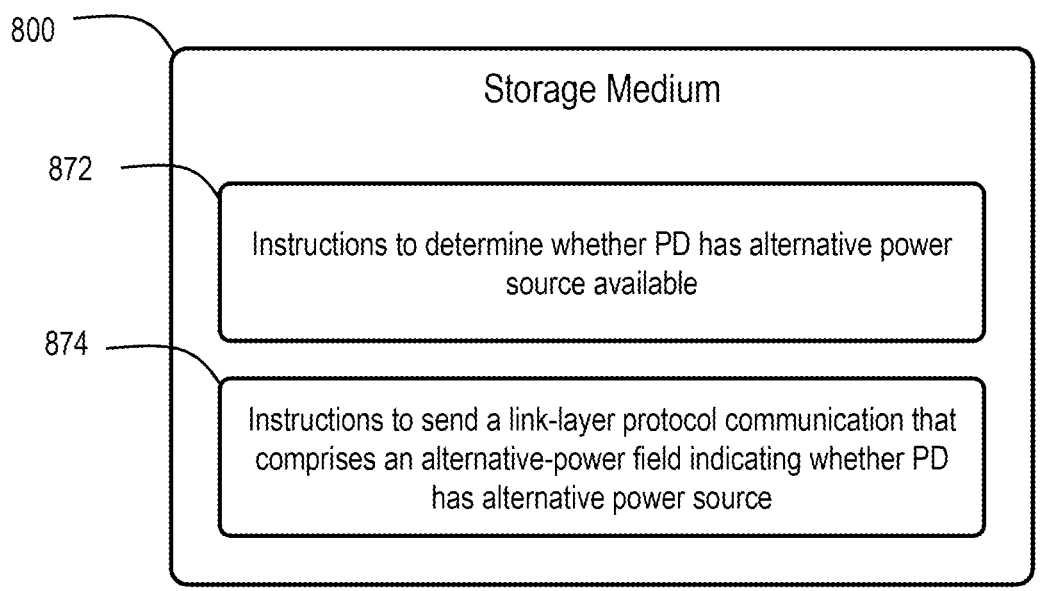
FIG. 8 is a block diagram illustrating an example storage medium storing instructions executable by a processor of a PoE PD.

Turning now to FIG. 8, an example non-transitory computer readable storage medium 800 (storage medium 800) is described. The storage medium 800 stores instructions 872 and 874, which are executable by a processor of a PD (e.g., a processor of the control circuitry 270 of PD 200) to cause the PD to perform various operations described herein. In some examples, the storage medium 800 is part of a PD, such as the PD 200. For example, in some implementations the storage medium 800 is part of the control circuitry 270, and the control circuitry 270 further comprises a processor coupled to the storage medium 800 and configured to read and execute the instructions 872 and 874. In some implementations, the storage medium 800 may be provided as a computer program product that is, at least initially, separate from a PD. The computer program product may be usable to program a PD to perform operations associated with the instructions 872 and 874 by, for example, transmitting the instructions 872 and 874 from the storage medium 800 to the PD for copying to local storage on the PD or for immediate execution by the PD.

The instructions 872 comprise instructions to determine whether PD has alternative power source available. The instructions 872 may comprise instructions to perform the operations 272 and other associated operations described above in relation to the PD 200.

The instructions 874 comprise instructions to send a link-layer protocol communication that comprises an alternative-power field indicating whether PD has alternative power source. The instructions 874 may comprise instructions to perform the operations 274 and other associated operations described above in relation to the PD 200.

Figure 9:
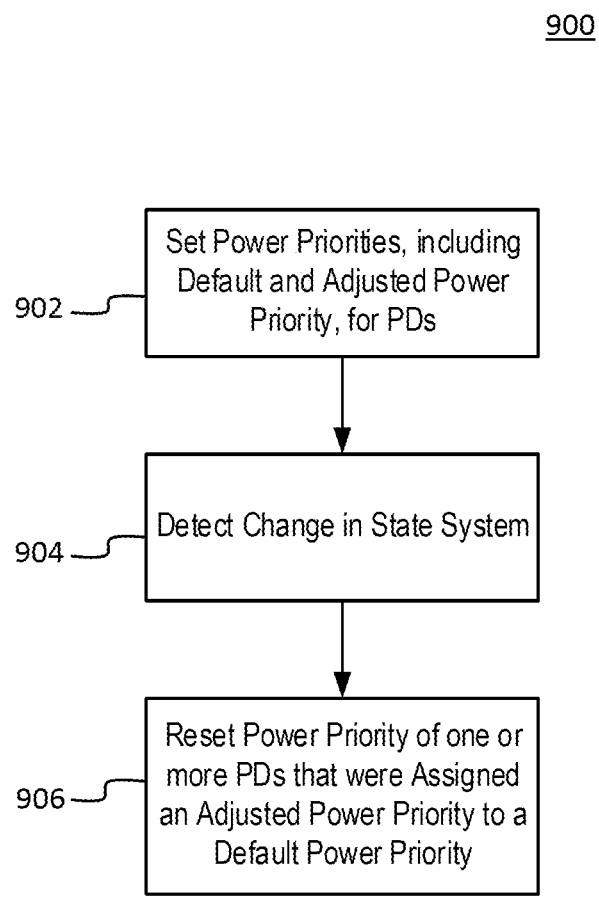
FIG. 9 is a process flow chart illustrating a fourth example method performable by a PoE PSE.

As shown in FIG. 9, the method 900 comprises operations of blocks 902, 904, and 906.

In block 902, the PSE sets power priorities for the PDs coupled thereto, including determining default power priorities for each of the PDs and also adjusted power priorities for PDs that have alternative power sources, according to any of the approaches described above (e.g., by performing method 400 or 600). The PSE may store the default power priorities of all of the PDs, including the PDs that were assigned adjusted power priorities.

In block 904, the PSE detects a change in state of the system. In some implementations, the change in state may be a change that affects the alternative power source of one of more of the PDs. For example, in some implementations the change in state comprises a degradation in the ability of the alternative power source of a given PD to adequately supply power to the PD. In some implementations, such a change in state may comprise the charge level of a battery dropping below a minimum threshold (which may be pre-determined or user-configurable, and may be the same as or different from the threshold mentioned in block 606 of method 600), a discharge rate of a battery exceeding another threshold, and/or some other battery fault state (e.g., the battery temperature exceeds a designated operating range, the battery becomes unplugged or otherwise unable to supply power, etc.). In some implementations, such a change in state may comprise a local power supply becoming unable to supply power (e.g., due to being unplugged or some other fault occurring), or the amount of power supplied by the local power supply being reduced. In some implementations, such a change in state may comprise a secondary PoE connection to another PSE ceasing to supply power or having an amount of power that is supplied be reduced. Such changes in the state of the alternative power sources of PDs may be communicated to the PSE, for example, via the Alt_Pwr fields of link-layer discovery protocol communications, which the PDs may send periodically and/or in response to events detected by the PD. In other examples, the change in state of the system may be some other change in state of the system. For example, an administrator may place the PSE in a designated mode which is considered the change in state.

In block 906, in response to the detection in block 904, the PSE may reset the power priority of one more PDs, which were previously assigned an adjusted power priority in block 902, to their respective default power priorities. In some examples, when the change in state detected in block 904 was the degradation in the ability of an alternative power source of a PD to supply power, only the PD (or PDs) that experienced the change in state will have their power priorities reset tot the default, and other PDs may keep their adjusted power priorities. In other examples, all PDs may have their power priorities reset to their default power priorities.

In the description above, various types of electronic circuitry are described. As used herein, "electronic" is intended to be understood broadly to include all types of circuitry utilizing electricity, including digital and analog circuitry, direct current (DC) and alternating current (AC) circuitry, and circuitry for converting electricity into another form of energy and circuitry for using electricity to perform other functions. In other words, as used herein there is no distinction between "electronic" circuitry and "electrical" circuitry.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

And/or: Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within ±1% of the stated value, property, or relationship unless indicated otherwise.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. A power-over-Ethernet (POE) power sourcing equipment (PSE), comprising:
    ports connectable via respective communications links to PoE powered devices (PD) to supply power to and exchange communications with the PDs; and
    control circuitry configured to, in a state of a plurality of PDs being connected to the ports:
        receive, from the plurality of PDs, link-layer protocol communications that each comprises an alternative-power field indicative of whether the PD that sent the respective communication has an alternative power source; and
        set power priorities for the plurality of PDs based at least in part on the respective alternative-power fields of the communications.

2. The PSE of claim 1,
    wherein setting the power priorities for the plurality of PDs based at least in part on the respective alternative-power fields of the communications comprises the control circuitry:
        determining default values for the power priorities of the plurality of PDs; and
        setting the power priority of a first PD of the plurality of PDs to an adjusted value, which is lower than the default value for the first PD, in response to the alternative-power field of a communication received from the first PD indicating that the first PD has an alternative power source.

3. The PSE of claim 1,
    wherein setting the power priorities for the plurality of PDs based at least in part on the respective alternative-power fields of the communications comprises the control circuitry:
        determining default values for the power priorities for the plurality of PDs;
        setting the power priorities of any of the PDs that do not have an alternative power source, as indicated by the alternative power fields, to their respective default values; and
        setting the power priorities of any of the PDs that do have an alternative power source, as indicated by the alternative power fields, to respective adjusted values, which are lower than the respective default values for the respective PDs.

4. The PSE of claim 1,
    wherein setting the power priorities for the plurality of PDs based at least in part on the respective alternative-power fields of the communications comprises the control circuitry decreasing the power priorities, relative to respective default values, of any PDs that do have an alternative power source, as indicated by the alternative power fields.

5. The PSE of claim 1,
    wherein setting the power priorities for the plurality of PDs based at least in part on the respective alternative-power fields of the communications comprises the control circuitry, for each of the PDs that has an alternative power source, as indicated by the alternative-power fields:

determining if the alternative power source of the respective PD is adequate; and in response to determining that the alternative power source of the respective PD is adequate, decreasing the power priority of the respective PD relative to a default value of the power priority for the respective PD.

6. The PSE of claim 1,
wherein each alternative-power field that indicates an alternative power source is present also indicates a type of the alternative power source.

7. The PSE of claim 6,
wherein the control circuitry is configured to negotiate with a given PD to cease supply of power to the given PD in response to the alternative-power field of a communication received from the given PD indicating a particular type of alternating power source is present.

8. The PSE of claim 6,
wherein the types of alternative power source that can be indicated by the alternative-power fields include: a battery, a local power supply, and/or a connection to a second PSE.

9. The PSE of claim 8,
wherein each alternative-power field that indicates that the sending PD has a battery also indicates an estimated run time and/or a charge level of the battery.

10. The PSE of claim 9,
wherein the control circuitry is configured to, for each PD that has a battery as indicated by the alternative-power fields, compare the estimated run time and/or charge level of the battery to a threshold and:
set a power priority of the respective PD to a default value in response to the estimated run time and/or charge level of the battery being less than the threshold; and
set a power priority of the respective PD to an adjusted value, lower than the default value, in response to the estimated run time and/or charge level of the battery being greater than the threshold.

11. The PSE of claim 1,
wherein the control circuitry is configured to detect a change in state of the system and, in response to detecting the change in state, reset the power priority of one or more PDs from a previously assigned adjusted value to a default value.

12. The PSE of claim 1,
wherein the alternative-power field comprises a time-length-value (TLV) data structure of a data unit of the link-layer protocol.

13. A power-over-Ethernet (POE) powered device (PD), comprising:
a port connectable via a communications link to a PoE power sourcing equipment (PSE) to receive power from and exchange communications with the PSE; and
control circuitry configured to, in a state of the port being connected to the PSE:
determine whether an alternative power source, other than the PSE, is available to the PD;
send, to the PSE via the port, a link-layer protocol communication that comprises an alternative-power field indicating whether the PD has the alternative power source.

14. The PD of claim 13,
wherein the control circuitry is configured to, in response to determining that an alternative power source is available to the PD:
determine a type of the alternative power source, and indicate the type of the alternative power source in the alternative-power field of the communication.

15. The PD of claim 14,
wherein types of alternative power sources recognized by the control circuitry comprise a battery, a local power supply, and a connection to a second PSE.

16. The PD of claim 15,
wherein the control circuitry is configured to, in response to determining that an alternative power source is available to the PD and the alternative power source is a battery, indicate an estimated run time and/or a charge level of the battery in the alternative-power field of the communication.

17. The PD of claim 13,
wherein the link-layer protocol is one of: Link-Layer Discovery Protocol (LLDP), Cisco Discovery Protocol (CDP), Foundry Discovery Protocol (FDP), Nortel Discovery Protocol (NDP), or Link Layer Topology Discovery (LLTD).

18. The PD of claim 13,
wherein the alternative-power field comprises a time-length-value (TLV) data structure of a data unit of the link-layer protocol.

19. A system comprising:
one or more power-over-Ethernet (POE) powered devices (PDs), each PD comprising:
a PD PoE port; and
PD control circuitry; and
a PoE power sourcing equipment (PSE) comprising:
PSE PoE ports connectable via respective communications links to the respective PD PoE ports of the PDs to supply power to and exchange communications with the PDs; and
PSE control circuitry,
wherein the PD control circuitry of each of the PDs is configured to, in a state of the respective PD being connected to one of the PSE PoE ports, send to the PSE a link-layer protocol communication that comprises an alternative-power field indicating whether the respective PD has an alternative power source;
wherein the PSE control circuitry is configured to, in a state of the PDs being connected to the PSE PoE ports:
receive, from the PDs, the link-layer protocol communications; and
set respective power priorities for the PDs based at least in part on whether the PDs have respective alternative power sources as indicated by the respective alternative-power fields of the communications.

20. The system of claim 19,
wherein the link-layer protocol is one of: Link-Layer Discovery Protocol (LLDP), Cisco Discovery Protocol (CDP), Foundry Discovery Protocol (FDP), Nortel Discovery Protocol (NDP), or Link Layer Topology Discovery (LLTD); and
wherein the alternative-power field comprises a time-length-value (TLV) data structure of a data unit of the link-layer protocol.

* * * * *